(12) United States Patent
King et al.

(10) Patent No.: US 6,854,410 B1
(45) Date of Patent: Feb. 15, 2005

(54) UNDERWATER INVESTIGATION SYSTEM USING MULTIPLE UNMANNED VEHICLES

(75) Inventors: Russell King, Panama City, FL (US); Brian Coppola, Lynn Haven, FL (US); Don Tibbetts, Lynn Haven, FL (US); Chris Richburg, Panama City, FL (US); Chris Cook, Lynn Haven, FL (US); Don Hobden, Lynn Haven, FL (US); Mike Conn, Panama City, FL (US); Spencer Harris, Panama City, FL (US); Wells Parker, Panama City, FL (US); Brooke Parker, Panama City, FL (US); David Emery, Panama City, FL (US); Sally Lankamer, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/719,854

(22) Filed: Nov. 24, 2003

(51) Int. Cl.$^7$ ............................................... B63B 21/66
(52) U.S. Cl. ...................................... 114/244; 114/258
(58) Field of Search .......................... 114/244, 258–260

(56) References Cited

U.S. PATENT DOCUMENTS 5,660,135 A * 8/1997 Gomes et al. .............. 114/312
5,786,545 A * 7/1998 Hillenbrand ............... 114/21.2
6,376,762 B1 * 4/2002 French et al. ................. 114/22

* cited by examiner

Primary Examiner—Jesus D. Sotelo
(74) Attorney, Agent, or Firm—James T. Shepherd (57) ABSTRACT

An unmanned system for investigating underwater regions utilizes an unmanned mothership and a plurality of unmanned underwater vehicles (UUVs). The mothership transports the UUVs to and from the vicinity of an underwater region, releases the UUVs into the water, and facilitates recovery of the UUVs from the water. Each UUV can traverse an underwater region, generate sonar and image data associated with the underwater region, and transmit the sonar and image data through the water for receipt and re-transmission by the mothership. A docking system mounted partially onboard the mothership and partially onboard each UUV couples each UUV to the mothership and selectively releases each UUV into the underwater region. A guidance system mounted partially onboard the mothership and partially onboard each UUV guides each UUV back to the docking system from positions in the water. The mothership and UUVs can also be equipped with a non-contact electrical energy transfer system so that each UUV can return to the mothership and re-charge onboard batteries while underwater.

17 Claims, 7 Drawing Sheets

UNDERWATER INVESTIGATION SYSTEM USING MULTIPLE UNMANNED VEHICLES

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to underwater investigation systems, and more particularly to an unmanned system that uses multiple vehicles to investigate an underwater region.

BACKGROUND OF THE INVENTION

Underwater investigations are conducted for a variety of reasons to include mine hunting, search and rescue operations, bottom mapping, marine life studies, the viewing of maritime accidents and shipwrecks, and environmental investigations. The means for carrying out these investigations are as varied as the types of investigations. For example, in terms of mine hunting, underwater reconnaissance is currently conducted by both manned and unmanned systems, a variety of which will described briefly below.

The use of a dedicated mine hunting ship (DMHS) is the traditional method of clearing mines. However, the DMHS is an expensive piece of equipment and is expensive to run owing to the costs associated with the wages of the ship's crew. The DMHS requires the use of valuable manpower that could be more productively used in other tasks. The DMHS also uses valuable harbor space due to its size. The mine hunting exercise itself cannot be made in a timely manner due to the ship's lack of speed. Furthermore, the imminent hazards associated with placing a ship and its personnel into a minefield make this method of mine hunting the least attractive.

A helicopter towed sensor (HTS) has become a more available and quicker method of mine hunting. However, the HTS is plagued by short duration mission capability due to a helicopter's fuel requirements. The complexity of launching and recovering the equipment from the helicopter prevents this approach from being performed at night. Finally, the inherent instability of helicopter flight can make the HTS mission an extremely dangerous one.

Even more recently, a remote vehicle towed sensor (RVTS) involves the towing of a sensor behind a semi-submersible vehicle. However, the semi-submersible vehicle must be powerful enough to overcome the large drag forces associated with a tow cable. The drag on the tow cable also limits the speed of the RVTS resulting in long missions. The tow cable also inhibits maneuverability. Further, in order to keep the tow cable properly tensioned, the RVTS must make very large and time consuming turns.

Another unmanned option utilizes an unmanned underwater vehicle (UUV) equipped with onboard sensors. However, this type of system is not capable of completing the mine hunting mission with the current capabilities of UUVs. The power density of such a craft would require it to travel at extremely slow speeds for the entire time that it is on a mission. The fact that the craft is underwater for the entire mission also prevents communication with the host ship. This lack of communication would require the host to wait for hours or days before critical information is received.

Another drawback of this type of system is endurance. That is, current battery technology does not give this type of system enough endurance to complete longer missions. Still another problem is the inaccuracy of a UUV's inertial guidance system. Specifically, the inaccuracies in an inertial guidance system multiply over the course of the mission until the craft is so "lost" that any information that it recovers would be useless.

SUMMARY OF THE INVENTION

Accordingly, it is an object of the present invention to provide a system for performing underwater investigations.

Another object of the present invention is to provide a system that can perform unmanned underwater investigations to eliminate risk to personnel.

Another object of the present invention is to provide a system for carrying out long-term underwater investigations.

Other objects and advantages of the present invention will become more obvious hereinafter in the specification and drawings.

In accordance with the present invention, an unmanned system for investigating underwater regions utilizes an unmanned mothership and a plurality of unmanned underwater vehicles (UUVs) supported by the mothership. The mothership transports the UUVs to and from the vicinity of an underwater region, releases the UUVs into the water, and facilitates recovery of the UUVs from the water. Each UUV includes propulsion and navigation means for traversing an underwater region, sonar means for generating sonar data associated with the underwater region, electro-optic imaging means for generating image data of selected areas of the underwater region, and underwater communication means for transmitting the sonar and image data through the water. The mothership is similarly equipped for navigation through the water. The mothership can include, in modular form, a first module for controlling navigation thereof, a second module for receiving and storing the sonar and image data transmitted through the water from each UUV, a third module for storing and dispensing fuel, a fourth module for propelling and steering the mothership in accordance with instructions received from the first module, and a fifth module for wirelessly transmitting the sonar and image data. A docking system is mounted partially onboard the mothership and partially onboard each UUV. The docking system couples each UUV to the mothership, and selectively releases each UUV into the underwater region. A guidance system is mounted partially onboard the mothership and partially onboard each UUV. The guidance system can guide each UUV back to the docking system from positions in the water. The mothership and UUVs can also be equipped with a non-contact electrical energy transfer system so that each UUV can return to the mothership and re-charge its onboard batteries while underwater.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
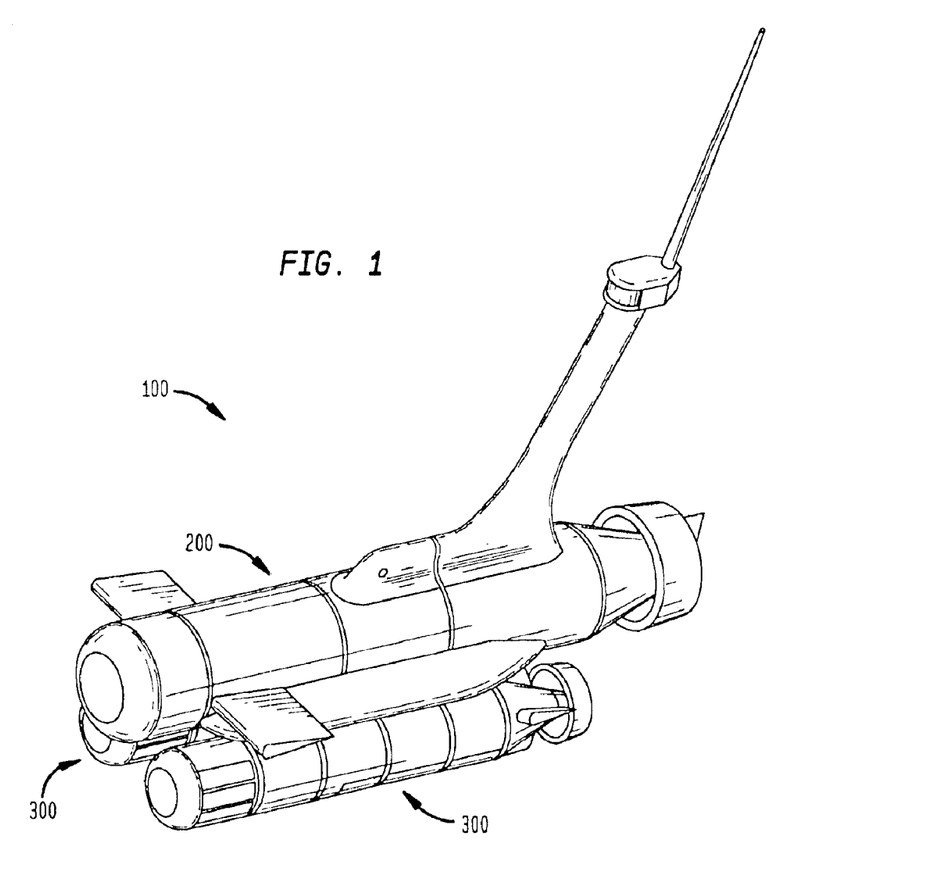
FIG. 1 is a perspective view of an embodiment of an underwater investigation system that uses multiple unmanned vehicles in accordance with the present invention.

Referring now to the drawings, and more particularly to FIG. 1, an underwater investigation system using multiple unmanned vehicles is shown and is referenced generally by numeral 100. By way of illustrative example, underwater investigation system 100 will be described for its use in mine hunting operations. However, as will be understood by one of ordinary skill in the art, system 100 can also be used in a variety of other underwater operations to include, for example, coastal sentry operations, search and rescue operations, undersea survey and/or mapping operations, maritime accident or shipwreck investigations, and marine life studies. Accordingly, it is to be understood that all references to mine hunting operations are not to be considered limitations of the present invention.

Underwater investigation system 100 includes an unmanned mothership 200 that can transport two or more (e.g., two are shown) unmanned investigative vehicles 300 underwater to and from an underwater region of interest. In general, mothership 200 is equipped to navigate at and under the water's surface, release and recover each of investigative vehicles 300, communicate with each of investigative vehicles 300, and communicate with a remote location such as a host or launching platform/ship (not shown). In general, each of investigative vehicles 300 can independently navigate underwater, sense and collect data associated with an underwater region, of interest as it traverses same, and communicate with mothership 200 while it is traveling underwater under its own power.

Figure 2:
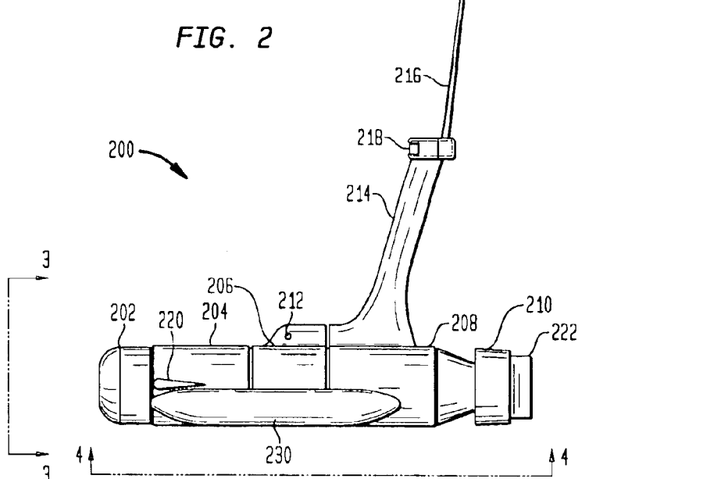
FIG. 2 is a side view of an embodiment of the underwater investigative system's unmanned mothership.
Figure 3:
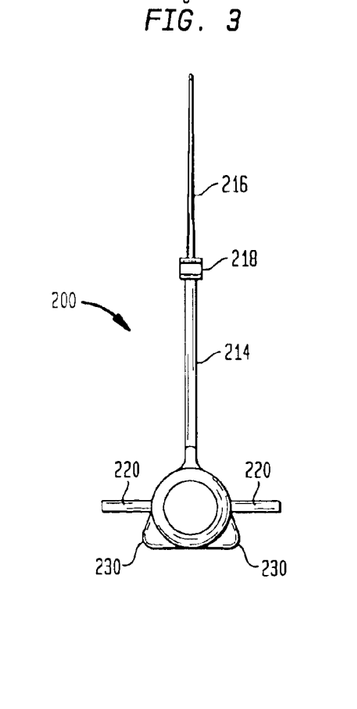
FIG. 3 is a head-on view of the mothership taken along line 3—3 in FIG. 2.
Figure 4:
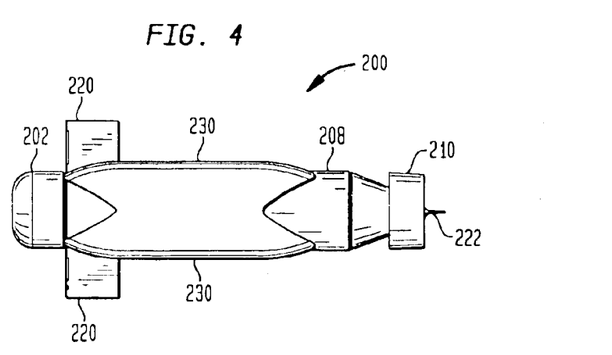
FIG. 4 is a bottom view of the mothership taken along line 4—4 in FIG. 2.

Referring additionally now to FIGS. 2–4, a more detailed description of mothership 200 will be provided. In the illustrative embodiment, mothership 200 is constructed in a substantially modular fashion to facilitate repairs and/or equipment updates/advances. The forwardmost or nose module 202 houses acoustic signal receiver(s) and transmitter(s) of the type that are well known in the art. For example, nose module 202 will typically house sonar system(s) used for obstacle avoidance and acoustic transceiver system(s) for communicating underwater with each of investigative vehicles 300. Aft of and coupled to nose module 202 is an electronics module 204 housing various well known navigation and communications electronics utilized for operation of mothership 200.

Aft of and coupled to electronics module 204 is a fuel module 206 that stores and dispenses fuel for mothership 200 as needed. Fuel module 206 is preferably located in the midsection of mothership 200 to minimize changes in the center of gravity caused by fuel usage. As is known in the art, fuel module 206 can house a fuel bladder that collapses with fuel usage. The resulting volume increase within fuel module 206 can be backfilled with seawater to aid in stabilizing the center of gravity and maintaining buoyancy of mothership 200.

Aft of and coupled to fuel module 206 is a propulsion module 208 that houses an engine (e.g., a diesel engine) receiving fuel from fuel module 206. At the very least, propulsion module 208 supplies power to a propulsor 210 (e.g., a propeller). Additionally, propulsion module 208 can be used to power electric generator(s) that can provide onboard electrical power and can be part of a battery charging system used by investigative vehicles 300 as will be explained further below.

Coupled to the top of mothership 200 is a lifting eye block 212 that would typically be coupled atop fuel module 206 (i.e., at or near the craft's center of gravity) so that mothership can be lifted and lowered thereby from a host platform/ship. Coupled atop propulsion module 208 is a communications module 214 that provides for wireless transmission/reception of signals via an antenna 216. Antenna can be standard radiowave antenna and can include a GPS antenna for receiving GPS signals that can be used to establish an accurate "own ship" position as is well known in the art. In order to allow mothership to operate covertly under the water's surface and to reduce space requirements when stowed on a host platform/ship, antenna 216 can be made retractable: Communications module 214 can also include a video camera 218 for providing images from above the water's surface when mothership 200 is operating at or just under the water's surface. Manipulation of mothership 200 as it travels through the water is facilitated by actuated wings 220 and a rudder 222.

Mounted on the lower portion of mothership 200 are docking pylons 230, each of which locks onto one of investigative vehicles 300 during the transport thereof, releases its investigative vehicle 300 into the water when so instructed, and provides the means to guide an investigative vehicle 300 back thereto during recovery of one of investigative vehicles 300. The capabilities provided by each of docking pylons 230 can be implemented in a variety of ways without departing from the scope of the present invention. However, by way of example, one embodiment of a docking pylon will be described later herein.

Figure 5:
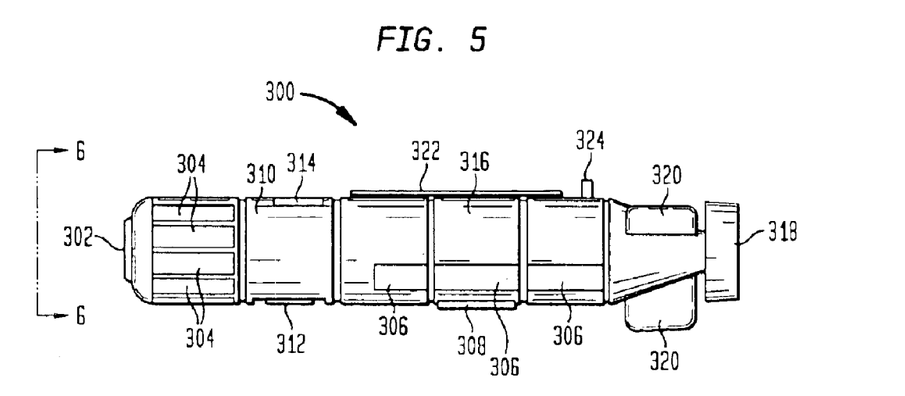
FIG. 5 is a side view of an embodiment of one of the underwater investigative system's unmanned investigative vehicles.
Figure 6:
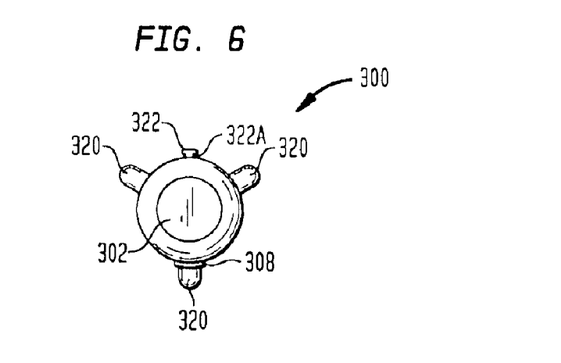
FIG. 6 is a head-on view of the investigative vehicle taken along line 6—6 of FIG. 5.

Referring additionally now to FIGS. 5 and 6, a more detailed description of one of investigative vehicles 300 will be provided. Typically, investigative vehicle 300 will be equipped with a variety of sonar capabilities utilizing different types of sonar sensors. For example, mine hunting operations could use a forward look sonar sensor 302 for obstacle avoidance, and one or more of volume search sonar sensors 304, side look sonar sensors 306, and gap fill sonar sensors 308, to collect sonar data about objects (e.g., mine like objects) in a surrounding underwater region as investigative vehicle 300 moves therethrough. The structure and operation of each of these sonar sensors are well known in the art and will not be described further herein. Each of the sonar sensors is coupled to processing electronics (not shown) mounted in an electronics module 310 positioned in the nose portion of investigative vehicle 300. Electronics module 310 would typically also house an internal guidance system as well as processing control for underwater communication.

In addition to being equipped for sonar data collection, investigative vehicle 300 has a conventional electro-optic imaging sensor 312 coupled thereto for collecting image data of any object or area of interest detected by the sonar equipment Imaging sensor 312 is controlled by equipment contained within electronics module. 310.

Sonar and image data collected by electronics module 310 is transmitted through the water acoustically by means of a conventional acoustic transceiver 314 coupled to investigative vehicle 300. Once again, processing control for acoustic transceiver 314 is housed in electronics module 310. The structure and operation of such acoustic transmission (and reception) is well understood in the art.

Aft of and coupled to electronics module 310 is a propulsion module 316 which can comprise one or more propulsion unit. Typically, propulsion module 316 houses a conventional electric propulsion motor (not shown) and batteries (not shown) for powering same. In-water re-charging of these batteries can be accomplished with a novel battery charging system that will be explained further below. The power from propulsion module 316 is supplied, to a propulsor 318 such as a propeller. Maneuverability of investigative vehicle 300 is controlled by actuated tail fins 320 controlled by systems in electronics module 310.

In the illustrative embodiment, investigative vehicle 300 has a docking rail 322 and an alignment sensor 324 mounted thereon aft of docking rail 322. Docking rail 322 provides a mechanical coupling designed to cooperate with a docking guide deployable from docking pylon 230 (FIG. 2) of mothership 200. Alignment sensor 324 cooperates with a guidance signal transmitted from mothership 200 to guide investigative vehicle to mothership 200 during a recovery operation that is depicted in FIG. 7.

Figure 7:
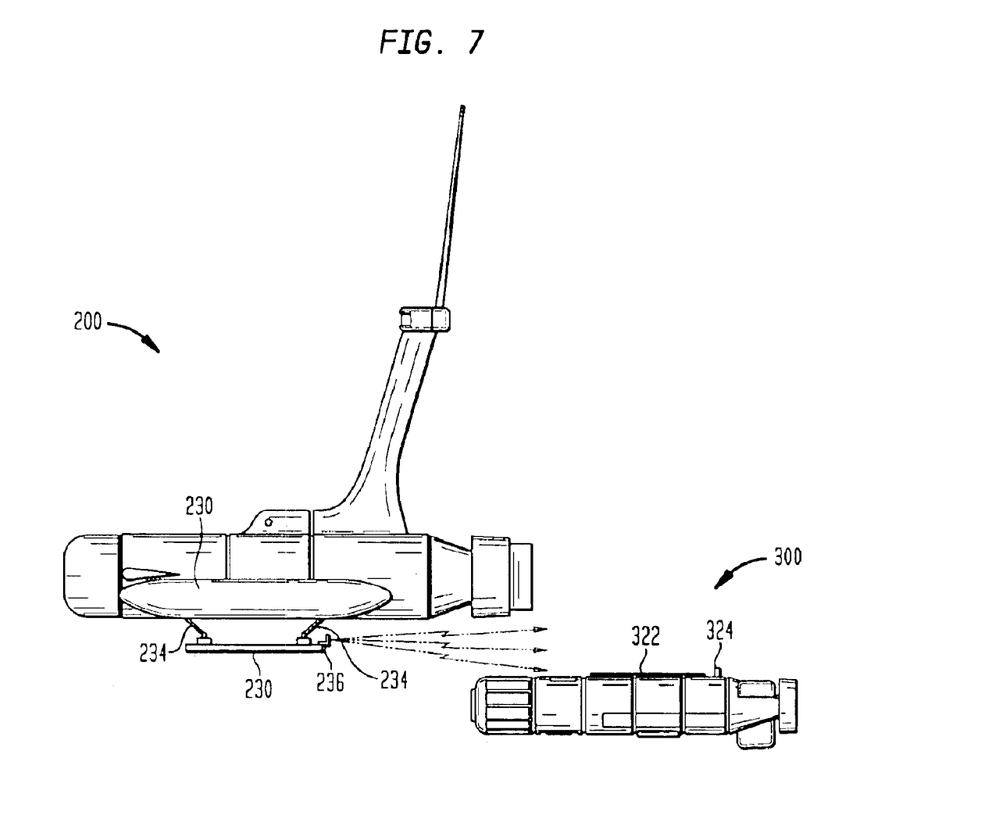
FIG. 7 depicts the mothership and an investigative vehicle during an investigative vehicle recovery operation.

Referring additionally to FIG. 7, the illustrated embodiment shows a docking guide 232 lowered from docking pylon 230 by means of retraction arms 234. Docking guide 232 is designed to receive/capture docking rail 322. To guide investigative vehicle 300 into alignment with docking guide 232, an alignment transmitter 236 is mounted on the aft end of docking guide 232. In general, alignment transmitter 236 transmits a signal into the water that alignment sensor 324 detects. Preferably, the signal should provide guidance information to processors (not shown) in electronics module 310 such that investigative vehicle 300 can be steered so that docking rail 322 aligns with docking guide 232 for capture thereby. That is, the signals detected by alignment sensor 324 should identify the navigation maneuvers required to bring docking rail 322 into alignment with docking guide 232 whereby docking guide 232 and docking rail 322 are coupled together.

One such guidance system for achieving this is described in U.S. patent application Ser. No., 10/609,902 filed Jun. 26, 2003, the contents of which are hereby incorporated by reference. Briefly, this patent application discloses a system whereby guidance is provided to a vehicle as it approaches a position. A guidance transmitter includes light sources arranged in an array and a controller coupled to the light sources. The array defines a primary field-of-view (FOV) from which all light sources are visible. Less than all of the light sources are visible from positions outside of the primary FOV. The light sources are divided into a plurality of sections with each section having a portion of the light sources associated therewith. Operation of the light sources is governed by the controller in accordance with cyclical on/off sequences. Each cyclical on/off sequence is (i) associated with a corresponding one of the sections, (ii) identical for the portion of the light sources associated with the corresponding one of the sections, and (iii) unique for each of the sections. A primary waveform of light energy is defined by the cyclical on/off sequence visible from within the primary FOV. A plurality of secondary waveforms of light energy are defined by the cyclical on/off sequences visible from positions outside of the primary FOV. A guidance receiver is mounted on a vehicle traveling towards the position of the guidance transmitter. The guidance receiver includes (i) sensor(s) for sensing light energy generated by those light sources visible thereto such that either the primary waveform or one of the secondary waveforms is sensed, (ii) a database for storing calibration waveforms where each calibration waveform is indicative of a guidance correction signal that can be used to control navigation of the vehicle, and (iii) processing means coupled to the sensor(s) and database for determining which one of the calibration waveforms matches or is closest to the sensed one of the primary waveform and secondary waveforms. The guidance correction signal associated with the matching calibration waveform can be used to control navigation of the vehicle.

As mentioned above, the underwater investigation system of the present invention can include an in-water battery re-charging system for extended investigative missions. In this way, each investigative vehicle 300 can briefly return to mothership 200, re-charge its onboard batteries, and then continue with its mission. To maintain the watertight integrity of both mothership 200 and investigative vehicle 300, such battery re-charging is preferably carried out in a non-contact fashion. One such non-contact electrical energy transfer system is described in a co-pending patent application entitled "NON-CONTACT ELECTRICAL ENERGY TRANSFER SYSTEM", Navy Case number 84899, the contents of which are hereby incorporated by reference.

Figure 8:
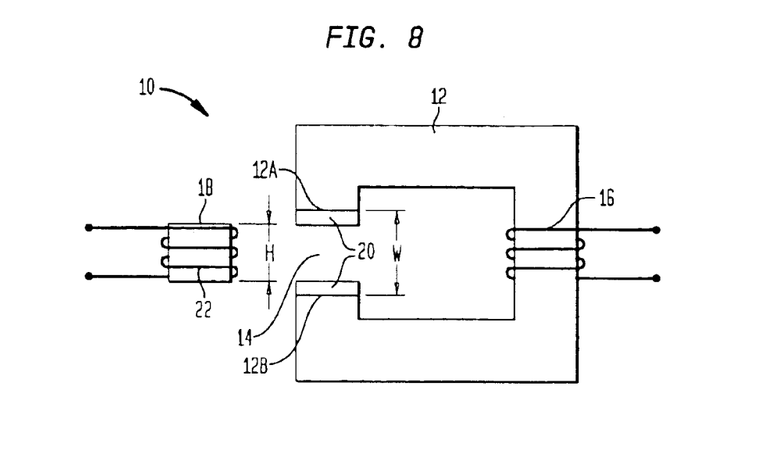
FIG. 8 is a schematic view of a non-contact electrical energy transfer system in a non-energy transfer mode.

In accordance with the teachings of this patent application, non-contact electrical energy transfer will be described with the aid of FIGS. 8 and 9. Specifically, a non-contact electrical energy transfer system is shown and is referenced generally by numeral 10. Energy transfer system 10 has a core 12 of a ferromagnetic material (i.e., iron, nickel, etc.) that is shaped to define a nearly continuous loop. That is, core 12 is discontinuous such that a gap 14 of width W is defined between ends 12A and 12B of core 12. Although the shape formed by core 12 is not a limitation of system 10, core 12 is illustrated as a C-shaped core to take advantage of simple iron core transformer concepts. Accordingly, coiled about core 12 at a region thereof that opposes gap 14 is an electrical conductor 16 (e.g., wire, strip of material, a conductive run of material adhered to core 12, etc.).

Energy transfer system 10 further includes a block 18 of the same ferromagnetic material used for core 12. Preferably, the cross-sectional area of block 18 matches the surface area of each of ends 12A and 12B. Block 18 is sized such that its height H is less than width W. The amount of difference between these two dimensions should provide for a small space between block 18 and each of ends 12A and 12B when block 18 is positioned in gap 14 as will be explained further below. To maintain such spacing between block 18 and ends 12A and 12B, a sleeve 20 can be provided in gap 14 where cross-sectional area of sleeve 20 is configured/sized to slidingly receive block 18. Sleeve 20 would typically be made from an electrically insulating material such as rubber, nylon, plastic or glass. Coiled about block 18 is an electric conductor 22 (e.g., wire, strip, a conductive run of material adhered to block 18, etc.).

Figure 9:
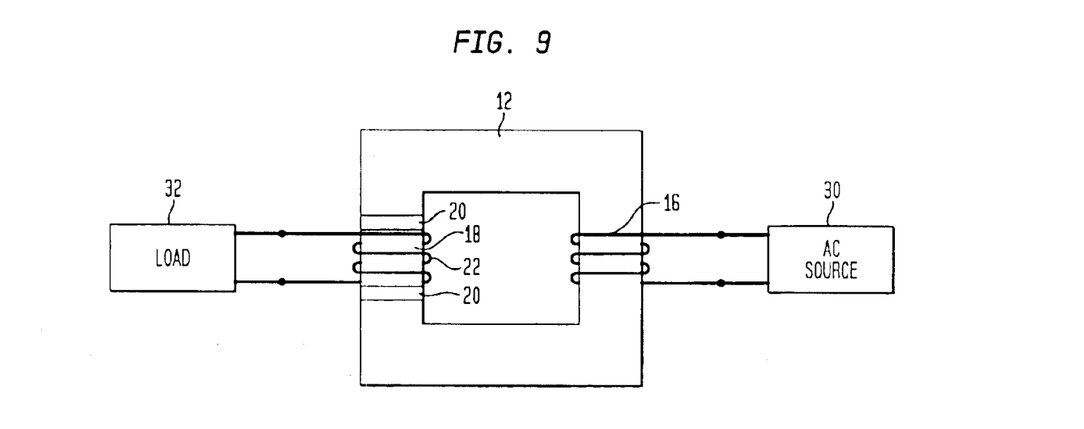
FIG. 9 is a schematic view of a non-contact electrical energy transfer system in an energy transfer mode.

When electrical energy transfer between conductors 1.6 and 22 is desired, block 18 is positioned in the gap (i.e., gap 14 illustrated in FIG. 8 but not shown in FIG. 9 for sake of clarity) by sleeve 20 as shown in FIG. 9. With block 18 so positioned, electrical energy (e.g., an AC voltage) is applied to electric conductor 16 by an AC source 30. The resulting alternating current that passes through electric conductor 16 induces a magnetic field in core 12. The magnetic field flux lines are concentrated by core 12 as is well understood in the transformer field. The lines of flux pass through the windings of electric conductor 22 thereby inducing an electric current in conductor 22 that is supplied to a load 32. The inclusion of insulating sleeve 20 prevents any arcing from occurring if AC source 30 is activated while block 18 is being positioned in sleeve 20.

By way of illustrative example, the above-described non-contact energy transfer system can be realized in the present invention as follows. Docking guide 232 could be constructed and shaped to serve as core 12 while docking rail 322 could be T-shaped (FIG. 6) with the base portion 322A thereof serving as block 18 of the re-charging system.

Figure 10A:
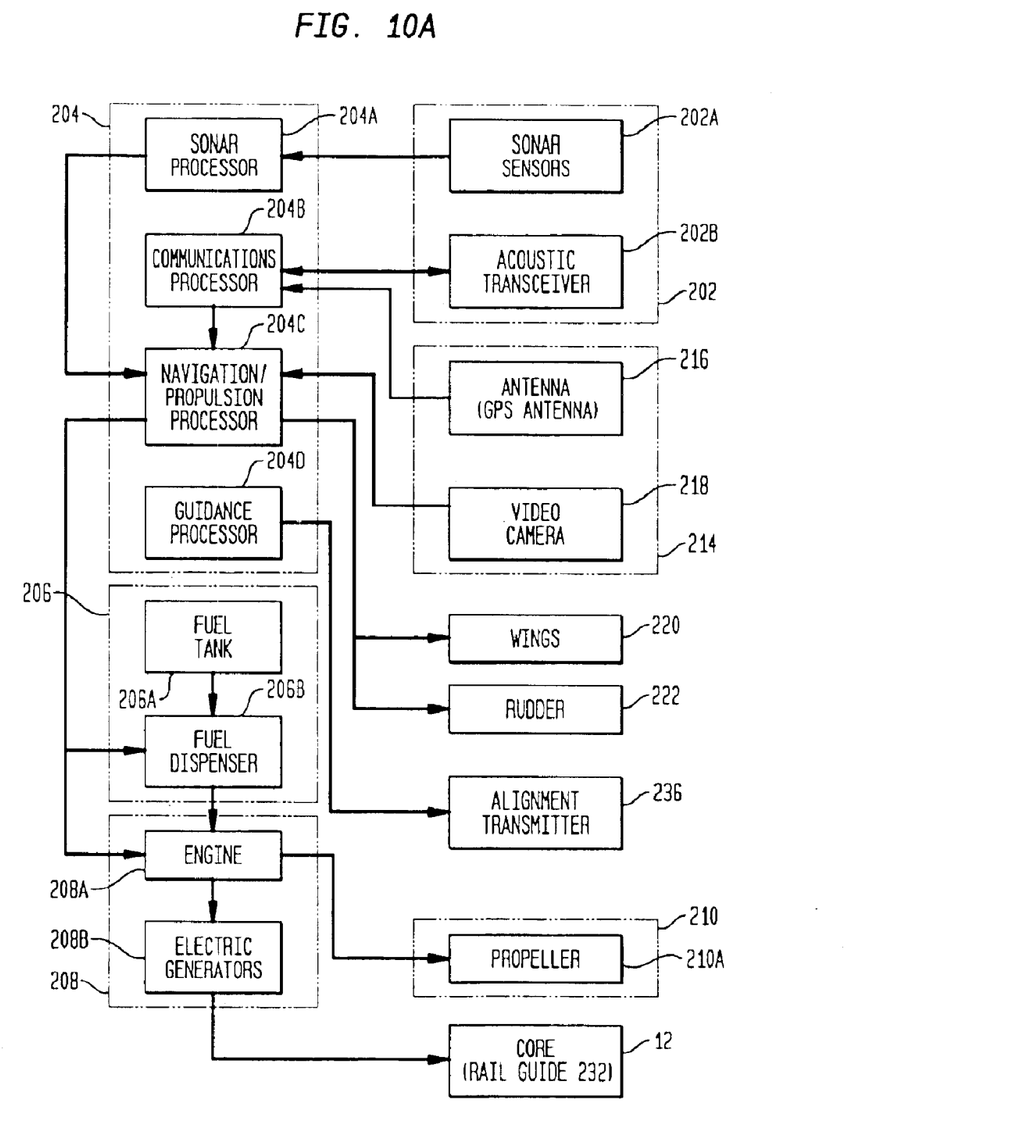
FIG. 10 is a block diagram illustrating the functional relationships of the components of the underwater investigation system.
Figure 10B:
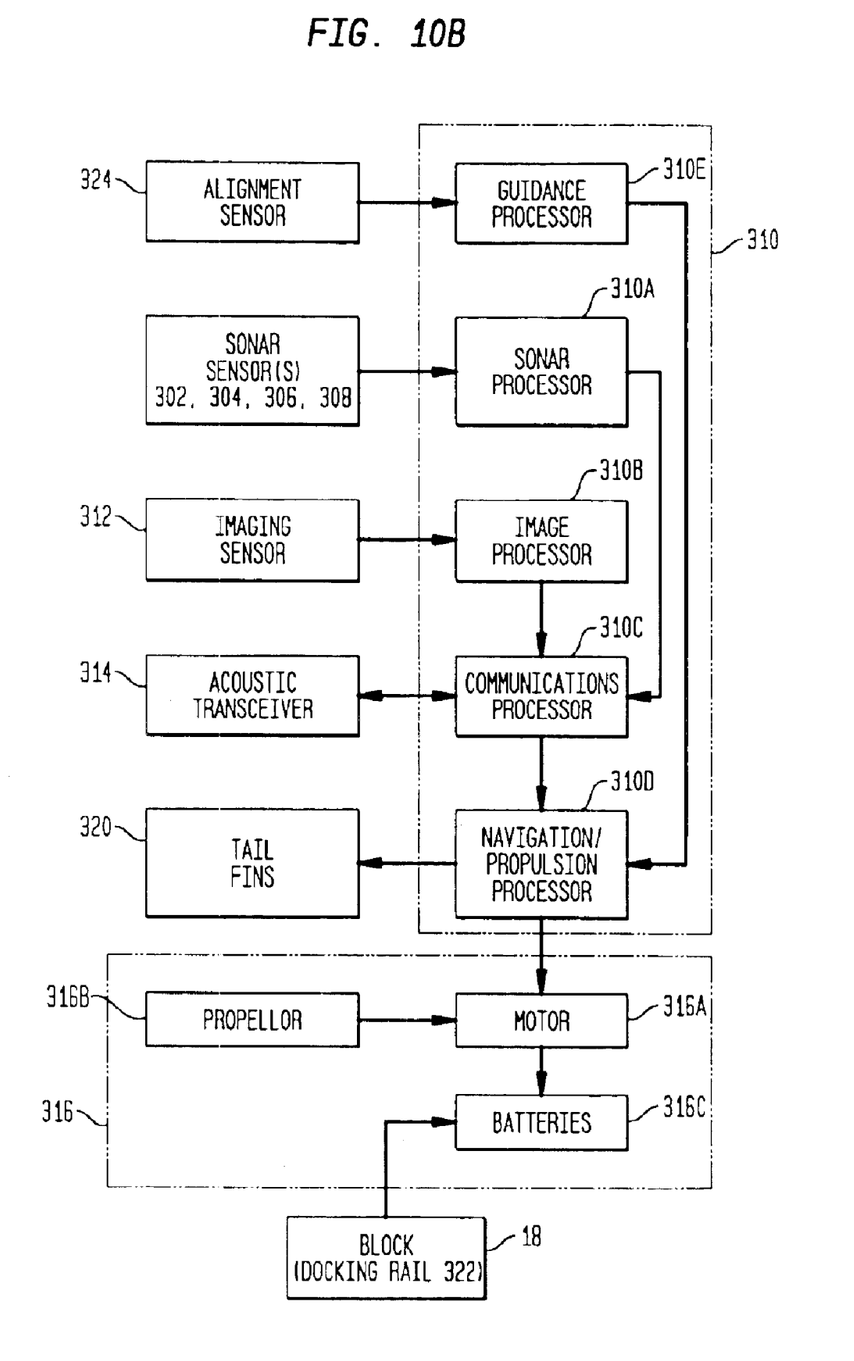

In order to provide a better understanding of the operation of the present invention, a functional block diagram of its various systems is provided in FIG. 10. With respect to mothership 200, nose module 202 supports or houses sonar sensors 202A and an acoustic transceiver 202B. Electronics module 204 houses a sonar processor 204A coupled to sonar sensors 202A, a communication processor 204B coupled to acoustic transceiver 202B, a navigation/propulsion processor 204C, and a guidance processor 204D coupled to 10, alignment transmitter 236 for controlling the output thereof.

Sonar processor 204A provides its output to navigation/propulsion processor 204C for navigation corrections in response to obstacle detection. Communications processor 204B handles underwater communications to/from acoustic transceiver 202B and wireless communications received at or transmitted from antenna 216. Navigation/propulsion processor 204C can implement a pre-programmed navigation route or could be controlled by navigation instructions transmitted from a remote location and received by antenna 216.

As mentioned above, antenna 216 can include a GPS antenna to receive GPS position signals that can be used to generate an accurate "own ship" position by navigation/propulsion processor 204C. The "own ship" position can then be acoustically transmitted through the water for use by each deployed investigative vehicle 300 to develop navigation connections. The use of GPS in this fashion to develop navigational connections is well understood in the art and will, therefore, not be described further herein.

Navigation/propulsion processor 204C also receives inputs from video camera 218 as an aid to making navigational corrections. Navigation/propulsion processor 204C controls the dispensing of fuel from tank 206A by means of dispenser 206B. Processor 204C further controls engine 208A and wings 220/rudder 222. The operation of engine 208A turns a propellor 210A and electric generators 208B which, in turn, applies electric energy to core 12 of the battery re-charging system described above.

With respect to investigative vehicle 300, sonar sensors 302–308 provide their outputs to a sonar processor 310A while image sensor 312 provides its output to an image processor 310B. The respective sonar and image data is provided to a communications processor 310C that formats the data for (underwater) acoustic transmission by an acoustic transceiver 314. Navigation/propulsion processor 310D can implement a pre-programmed navigation plan or could be controlled via navigation instructions transmitted underwater by acoustic transceiver 202B and received by acoustic transceiver 314. In either case, navigation and propulsion control is then provided to tail fins 320 and a motor 316A. In turn, motor 316A powers a propeller 316B and is powered by batteries 316C. Re-charging of batteries 316C is accomplished when block 18 (e.g., docking rail 322) cooperates with core 12 (e.g., rail guide 232) as described above. Finally, navigation control for a recovery of an investigative vehicle 300 is provided by a guidance processor 310E that receives its raw input from alignment sensor 324.

In operation, mothership 200 is deployed in the water with its investigative vehicles 300' coupled thereto. Mothership 200 navigates (e.g., according to a pre-programmed plan, under remote control for a host platform/ship via radio signals received by antenna 216, etc.) to the vicinity of an underwater region of interest. At a predetermined location(s), mothership 200 releases its investigative vehicles 300 into the water where they begin their independent underwater investigations (e.g., mine hunting sweeps). During such underwater investigations, collected sonar and image data is acoustically transmitted through the water for receipt and storage onboard mothership 200. At the same time, mothership 200 can re-transmit such data in a wireless fashion to a remote site by means of antenna 216. For longer missions, investigative vehicles 300 can return to mothership 200 for battery re-charging as described above. When an investigative mission is complete, each of vehicles 300 returns to mothership 200 for recovery and re-transport back to the deploying host platform/ship.

The advantages of the present invention are numerous. The underwater investigative system requires no personnel and requires nothing to be towed. By remaining substantially underwater at all times, the covertness of operations is maximized. Collected data is made available to remote locations in a near real-time fashion thereby allowing subsequent operations (e.g., mine destruction, rescue operations, etc.) to proceed in a timely fashion. Long-term missions are made possible by use of a novel non-contact energy transfer system that can be incorporated into the system's docking mechanisms.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An unmanned system for investigating underwater regions, comprising:

a plurality of unmanned underwater vehicles (UUVs), each of said plurality of UUVs including propulsion and navigation means for traversing an underwater region, sonar means for generating sonar data associated with the underwater region, electro-optic imaging means for generating image data of selected areas of the underwater region, and underwater communication means for transmitting said sonar data and said image data through the water;

an unmanned mothership equipped for navigation through the water, said unmanned mothership including, in modular form, a first module for controlling navigation of said unmanned mothership, a second module for receiving and storing said sonar data and said image data transmitted through the water from each of said plurality of UUVs, a third module for storing and dispensing fuel, a fourth module for propelling said unmanned mothership using said fuel from said third module and steering said unmanned mothership in accordance with instructions received from said first module, and a fifth module coupled to said second module for wirelessly transmitting said sonar data and said image data;

docking means mounted partially onboard said unmanned mothership and partially onboard each of said plurality of UUVs for coupling each of said plurality of UUVs to said unmanned mothership, and for selectively releasing each of said plurality of UUVs from said unmanned mothership into the underwater region; and guidance means mounted partially onboard said unmanned mothership and partially onboard each of said plurality of UUVs for guiding each of said plurality of UUVs back to said docking means from positions in the water, wherein said unmanned mothership transports said plurality of UUVs to and from the vicinity of the underwater region, releases said plurality of UUVs into the water, and facilitates recovery of said plurality of UUVs from the water.

2. An unmanned system as in claim 1 wherein said underwater communication means includes means for receiving underwater acoustic transmissions, and wherein said unmanned mothership further includes:

a GPS system having an antenna for receiving GPS signals, said GPS system determining a position of said unmanned mothership using said GPS signals; and an acoustic transmitter coupled to said GPS system for transmitting an acoustic signal into the water that is indicative of said position so-determined, wherein said acoustic signal is received by said underwater communication means for use by said propulsion and navigation means.

3. An unmanned system as in claim 1 wherein said first module includes a radio receiver for receiving navigation instructions for said unmanned mothership over the airwaves from a remote location.

4. An unmanned system as in claim 1 wherein said first module comprises a pre-programmed navigation system for directing said unmanned mothership along a predetermined route.

5. An unmanned system as in claim 1 wherein said propulsion and navigation means includes at least one rechargeable battery, said unmanned system further comprising battery charging means for recharging said at least one rechargeable battery, said battery charging means having a first portion that is mounted onboard said unmanned mothership and a second portion that is mounted on each of said plurality of UUVs, said first portion having a ferromagnetic material formed into a nearly continuous loop wherein a gap is formed between two opposing surfaces of said ferromagnetic material that defines the ends of said nearly continuous loop with said gap being submerged in the water, a first electric conductor coiled about a portion of said ferromagnetic material that is formed into said nearly continuous loop at a region thereof opposing said gap, and an AC power source coupled to said first electric conductor for applying an AC voltage thereto, said second portion having a block of said ferromagnetic material sized to loosely fit in said gap while being spaced apart from each of said opposing surfaces, a second electric conductor coiled about a portion of said block wherein said AC voltage applied to said first electric conductor induces an electric current in said second electric conductor when said block is positioned in said gap, means for positioning said block in said gap, and means coupled to said first electric conductor and said at least one rechargeable battery for utilizing said electric current to recharge said at lest one rechargeable battery, and said first portion further having means for keeping said block spaced apart from said opposing surfaces when said block is fitted in said gap.

6. An unmanned system as in claim 5 wherein said means for keeping is a sleeve positioned in said gap.

7. An unmanned system as in claim 5 wherein said means for keeping is an electrically insulating material interposed between each of said opposing surfaces and said block.

8. An unmanned system as in claim 7 wherein said electrically insulating material is selected from the group consisting of rubber, nylon, plastic and glass.

9. An unmanned system as in claim 5 wherein said ferromagnetic material is iron.

10. An unmanned system for investigating underwater regions, comprising:

a plurality of unmanned underwater vehicles (UUVs), each of said plurality of UUVs being (i) powered by at least one rechargeable battery, and (ii) equipped to traverse an underwater region, generate sonar data associated with the underwater region, generate image data of selected areas of the underwater region, and transmit said sonar data and said image data through the water;

an unmanned mothership equipped to (i) navigate through the water, (ii) receive and store said sonar data and said image data from each of said plurality of UUVs, and (iii) wirelessly transmit aid sonar data and said image data from said unmanned mothership;

battery charging means for recharging said at least one rechargeable battery, said battery charging means having a first portion that is mounted onboard said unmanned mothership and a second portion that is mounted on each of said plurality of UUVs, said first portion having (i) a ferromagnetic material formed into a nearly continuous loop wherein a gap is formed between two opposing surfaces of said ferromagnetic material that defines the ends of said nearly continuous loop with said gap being submerged in the water, (ii) a first electric conductor coiled about a portion of said ferromagnetic material that is formed into said nearly continuous loop at a region thereof opposing said gap, and (iii) an AC power source coupled to said first electric conductor for applying an AC voltage thereto, said second portion having (i) a block of said ferromagnetic material sized to loosely fit in said gap while being spaced apart from each of said opposing surfaces, (ii) a second electric conductor coiled about a portion of said block wherein said AC voltage applied to said first electric conductor induces an electric-current in said second electric conductor when said block is positioned in said gap, (iii) means for positioning said block in said gap, and (iv) means coupled to said first electric conductor and said at least one rechargeable battery for utilizing said electric current to recharge said at least one rechargeable battery, and said first portion further having means for keeping said block spaced apart from said opposing surfaces when said block is fitted in said gap;

docking means mounted partially onboard said unmanned mothership and partially onboard each of said plurality of UUVs for coupling each of said plurality of UUVs to said unmanned mothership, and for selectively releasing each of said plurality of UUVs from said unmanned mothership into the underwater region; and guidance means mounted partially onboard said unmanned mothership and partially onboard each of said plurality of UUVs for guiding each of said plurality of UUVs back to said docking means from positions in the water, wherein said unmanned mothership transports said plurality of UUVs to and from the vicinity of the underwater region, releases said plurality of UUVs into the water, and facilitates recovery of said plurality of UUVs from the water.

11. An unmanned system as in claim 10 wherein each of said plurality of UUVs is further equipped to receive underwater acoustic transmissions, and wherein said unmanned mothership is further equipped to (i) receive GPS signals, (ii) determine a position of said unmanned mothership using said GPS signals, and (iii) transmit an acoustic signal into the water that is indicative of said position so-determined, wherein said acoustic signal is received by each of said plurality of UUVs for use in traversing the underwater region.

12. An unmanned system as in claim 10 wherein said unmanned mothership is further equipped to receive navigation instructions for said unmanned mothership over the airwaves from a remote location.

13. An unmanned system as in claim 10 wherein said unmanned mothership is further equipped to direct said unmanned mothership along a predetermined route.

14. An unmanned system as in claim 10 wherein said means for keeping is a sleeve positioned in said gap.

15. An unmanned system as in claim 10 wherein said means for keeping is an electrically insulating material interposed between each of said opposing surfaces and said block.

16. An unmanned system as in claim 15 wherein said electrically insulating material is selected from the group consisting of rubber, nylon, plastic and glass.

17. An unmanned system as in claim 10 wherein said ferromagnetic material is iron.

* * * * *